United States Patent [19]

Schaefer

[11] Patent Number: 4,526,409

[45] Date of Patent: Jul. 2, 1985

[54] EXPANSION JOINT

[75] Inventor: David A. Schaefer, Grand Island, N.Y.

[73] Assignee: Adsco Manufacturing Corp., Buffalo, N.Y.

[21] Appl. No.: 461,576

[22] Filed: Jan. 27, 1983

[51] Int. Cl.³ ............................................. F16L 13/04
[52] U.S. Cl. .................................... 285/114; 285/286; 285/301
[58] Field of Search ................ 285/300, 301, 286, 114

[56] References Cited

U.S. PATENT DOCUMENTS

| | | | |
|---|---|---|---|
| 2,207,146 | 7/1940 | Fentress et al. | 285/300 |
| 2,958,550 | 11/1960 | McDonald | 285/301 |
| 3,574,361 | 4/1971 | Contreras | 285/301 X |
| 3,997,194 | 12/1976 | Eifer et al. | 285/301 X |

Primary Examiner—Dave W. Arola
Attorney, Agent, or Firm—Christel, Bean & Linihan

[57] ABSTRACT

An expansion joint of the bellows type for installation between the end portions of two aligned pipes utilizes two stop members within the bellows being movable relative to one another and each being supported by opposite end portions of the joint for limiting the axial extension of the joint. Each stop member includes a tubular sleeve being fixed at one end to a respective end portion of the joint and a ring at the sleeve end opposite its attached end. When the joint extends axially a predetermined amount, the rings engage one another and prevent any further joint extension.

5 Claims, 3 Drawing Figures

EXPANSION JOINT

BACKGROUND OF THE INVENTION

The present invention relates in general to bellows-type expansion joints and more particularly to a new and improved joint having means for preventing overextension in the event of pipeline anchor failure.

An expansion joint with which this invention is concerned is installed between and coupled to the end portions of two rigid pipes or conduits for the purpose of absorbing axial movement resulting from pipeline expansion and contraction and absorbing some lateral deflection thereof. Such joints include an expansible bellows comprising a relatively thin walled, circumferentially corrugated tubular member, and end portions adapted for connection to the corresponding axially aligned pipe end portions. When the expansion joint is installed between two pipe end portions, the bellows expands and contracts in response to axial movement of the pipes between which it is connected, and the joint is constructed such that the expected range of pipe movement will cause expansion of the bellows well within the movement capability of the bellows. Pipe movement beyond a certain limit causing joint overextension and consequently extension beyond the movement capability of the bellows may result in a bellows rupture and consequent failure of the joint. To prevent such overextension, pipeline anchors are provided on opposite sides of the joint to limit axial pipe movements. Also in some instances external restraint hardware may be provided on the joint itself. However, if one or more anchors or external restraints should happen to fail, control of the joint expansion or pipe movement is lost and the joint is exposed to possible overextension.

SUMMARY OF THE INVENTION

It is, accordingly, an object of this invention to provide a new and improved expansion joint having means for limiting the axial extension of the joint in case of pipeline anchor failure.

It is a further object of this invention to provide such an expansion joint having means of sound construction for preventing further extension of the joint beyond a predetermined axial length.

It is a further object of this invention to provide such an expansion joint which is efficient and effective in operation and convenient and economical to manufacture and maintain.

The present invention provides an expansion joint including expansible bellows, opposite end portions adapted for connection to substantially axially aligned pipe end portions, and internal stop means carried by the joint end portions and located within the bellows for limiting the axial extension of the joint.

The foregoing and other objects, advantages and characterizing features of the present invention will become clearly apparent from the ensuing detailed description of an illustrative embodiment thereof taken together with the accompanying drawings.

BRIEF DESCRIPTION OF THE DRAWING FIGURES

DETAILED DESCRIPTION OF AN ILLUSTRATIVE EMBODIMENT

Figure 1:
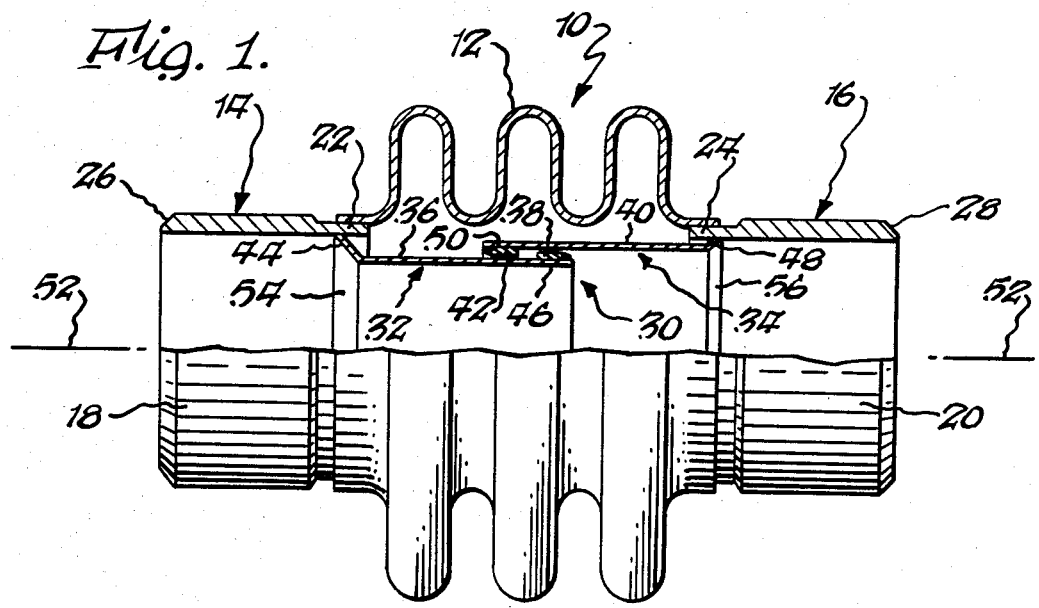
FIG. 1 is an elevational view, partly in section, of a bellows-type expansion joint having internal stop means according to the present invention.

Referring now to the drawing, FIG. 1 shows a bellows type expansion joint, generally designated 10, adapted for installation between end portions of two rigid tubular pipes (not shown) in a known manner. The joint 10 includes a bellows 12 comprising a corrugated, tubular member and two opposite end portions 14, 16 for coupling the joint to the pipe end portions.

The bellows 12 is constructed of relatively thin-walled metal, for example stainless steel, nickel, or aluminum, and defines a series of circumferential corrugations along its length. While three corrugations are included in the illustrative bellows shown, any number of corrugations can be provided in a known manner. Each joint end portion 14 and 16 is defined by an elongated tubular pipe nipple 18 and 20, respectively. In the illustrative joint shown, the outer surface of each nipple has a reduced diameter portion at one end, i.e. the end adjacent bellows 12, and has a beveled portion at the opposite end. In particular, nipples 18 and 20 have reduced ends 22 and 24, respectively, and beveled ends 26 and 28, respectively. Each reduced end 22 and 24 of the nipples is tightly received within a respective end of the bellows 12 and is sealingly attached, as by welding, to the respective bellows end. Each beveled end 26 and 28 of the nipples is of such size to accept an end portion of a pipe to which the joint is to be coupled. Each nipple is constructed of metal and, when a pipe received therein, is welded to the pipe for coupling thereto.

Each of the pipes between which the expansion joint 10 is adapted to be coupled typically is anchored at one or more selected locations along its length to a fixed pipe anchor so that each pipe is prevented from moving relative to the pipe anchor at the selected, or anchored, location. Therefore, the pipeline expansion or contraction which the expansion joint 10 is expected to absorb occurs between the two adjacent anchor points in the pipeline in which the joint is installed. The amount of pipeline expansion or contraction can be predicted from the operating conditions of the system, such as the temperature and pressure of fluids to flow therethrough so that the installed joint may be sized accordingly to expand or contract within the movement capability of the bellows, i.e. the allowable strain per bellows corrugation. Also, in some instances external restraint hardware may be provided on the joint itself, such as on the ends 14,16. In any event, if an anchor or external restraint on either side of the joint fails, the pipe is permitted to move relative to the anchor and exposes the expansion joint to possible overextension and resulting damage to the bellows.

In accordance with this invention, the joint 10 includes stop means, generally designated 30, carried by the relatively movable portions of joint 10 and located within bellows 12, for limiting the axial extension of the joint and thereby preventing the possible overextension of the joint if an anchor or external restraint fails. The stop means 30 includes a first stop member generally designated 32 and a second stop member generally designated 34, each member being supported by a respective nipple 18 and 20. The first stop member 32 includes a first elongated portion in the form of a first tubular sleeve 36 extending axially inwardly from nipple 18 and a first stop element or ring 38 fixedly attached to the inner end of the sleeve 36, and the second stop member 34 includes a second elongated portion in the form of a second tubular sleeve 40 extending axially inwardly from nipple 26 and a second stop element in the form of ring 42 attached to the inner end of the sleeve 40. The first sleeve 36 includes two opposite end portions 44,46 and the second sleeve 40 includes opposite end portions 48 and 50. One end portion 44 or 48 of each sleeve 36 or 40 defines an annular surface 54 or 56 inclined to the joint longitudinal axis, indicated 52, of the joint 10 and is fixedly attached by suitable means, such as welding, to a respective nipple 18 or 20 along the nipple inner wall. Each sleeve 36,40 extends along the inner wall of the bellows 12 from the nipple to which it is attached a substantial portion of the length of the bellows.

Figure 2:
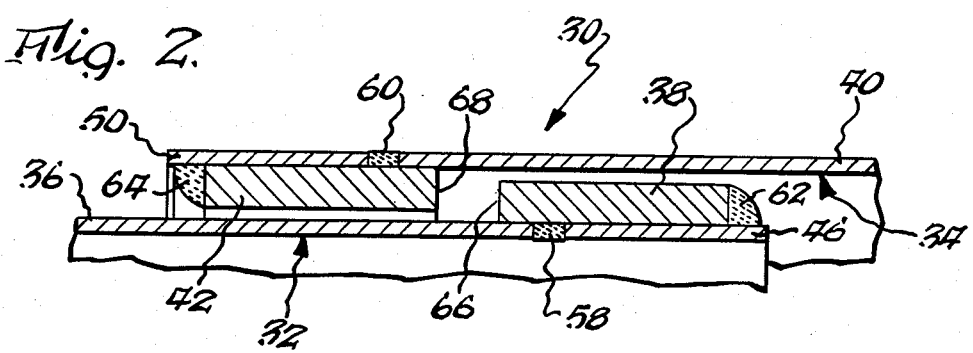
FIG. 2 is a view of the rings of the FIG. 1 joint drawing to a slightly larger scale.

One sleeve 36 is of slightly smaller diameter than the other sleeve 40 so that, and is best shown in FIG. 1, the free end portion 46 of the one sleeve 36 is movable within the free end portion 50 of the other sleeve 40. As the nipples 18 and 20 move toward or away from one another due to the contraction or expansion of the joint 10, the sleeves 36 and 40 move relative to one another in a telescoping fashion. Thus, the stop element 38 and 42 fixed to sleeves 36 and 40, respectively move toward and away from each other in exact correspondence with the movement of nipples 18 and 20, respectively. The stop element or ring 38 provides the free end portion 46 of sleeve 36 with a radially outwardly extending flange, and the stop element or ring 42 provides the free end portion 50 of the sleeve 40 with a radially inwardly extending flange. A small clearance exists between the ring 38 and the sleeve 40 and between the ring 42 and the sleeve 36, as best shown in FIG. 2. The ring 38 is fixedly attached to the outer wall of the sleeve 36 by a plurality of plug welds, such as the one designated 58, and by a plurality of bead welds, such as the one designated 62. Similarly ring 42 is fixedly attached to the inner wall of the sleeve 40 by a plurality of plug welds such as the one indicated 60 and a plurality of bead welds such as the one indicated 64. The ring 38 defines a first abutment surface 66 disposed in a plane substantially perpendicular to the longitudinal axis 52, and the ring 36 defines a second abutment surface 68 disposed in a plane substantially perpendicular to axis 52. When the joint extends to a predetermined length, the abutment surfaces 66 and 68 are so located to engage one another so that any further extension of the joint is prevented. It will also be understood that as the joint 10 extends axially to or contracts axially from such a predetermined length the abutment surfaces 66 and 68 move into and out of engagement with one another.

The provision of internal sleeve means, for example the telescoping sleeves 36 and 40, serves to reduce turbulence induced by high velocity flow through the expansion joint thereby promoting smooth flow. The internal sleeve means also serves to protect the internal sleeve means also serves to protect the internal surface of bellows 12 from erosion due to particles carried by the fluid flowing therethrough. Having the stop elements 38,42 operatively associated with internal sleeve means combines the foregoing advantages with the protection against anchor or restraint failure.

To minimize material and labor costs during construction of the joint 10, consideration is given to the amount of welding necessary to hold the rings to the sleeves in case of anchor failure. Such amount must be sufficient, however, to present the rings from shearing due to the axial thrust expected to be encountered by the joint when an anchor fails and the abutment surfaces 66 and 68 move into engagement with one another.

The present invention is illustrated further by the following example which is a typical calculation to check the thickness of stops 38,42 and amount of weld required to resist thrust in the event of an anchor failure. Assume a 16 inch outer diameter (the outer diameter of nipple 18 or 20) bellows type expansion joint operating at 100 psi and 400° F. The bellows pitch diameter is 18 inches. The thrust area is $(18)^2 \pi/4$ or 254 square inches. The total thrust is 254 square inches times 100 psi or 25,400 pounds.

Assume further that each of sleeves 36 and 40 is 3/32 inch thick, that each of the stop elements 38,42 is ¼ inch thick (i.e. the radial thickness), that a 1/16 inch clearance exits between the outer surface of ring 38 and the inner surface of sleeve 40, and that each nipple 18,20 has a wall thickness of ⅜ inch. Assume also that the mean diameter of the inner sleeve 36 is 14.22 inch and the mean radial distance between sleeve 36 and the axial extension of each nipple 18,20 is 0.89 inch. Thus, the total metal area in tension is $(14.22)(\pi)(0.0934) = 4.17$ square inches. The allowable stress for type 304 stainless steel, the material for stops 38,42 in this example, at 400° F. is 16,200 psi. Therefore, the total metal area in tension (4.17 square inch) times the allowable stress of 16,200 psi gives a result of 67,600 pounds which is greater than the 25,400 pounds total thrust of the joint. Accordingly, the ¼ inch thickness for stops 38,42 is sufficient to resist thrust in the event of an anchor failure.

With respect to amount of weld required, assume that each stop 38 or 42 has a radial thickness of 0.250 inch and an axial length of 2 inches. Assume further that the plug welds are eight in number equally spaced circumferentially around the corresponding sleeve with each plug having a ½ inch diameter bore in the corresponding sleeve. Assume also a mean diameter of 14.56 inch for one of the stops. Therefore, the weld root area is $(0.093)(0.707)(14.56)(\pi)$ which equals 3 for the bead weld and $(8)(0.5^2 \pi/4)$ which equals 1.6 for the plug welds for a total weld area of 4.6 square inches. At 8000 psi allowable, $(4.6)(8000)$ equals 36,800 pounds which is greater than the 25,400 pounds total thrust of the joint. Accordingly, the foregoing weld amounts are sufficient to resist thrust in the event of anchor failure.

Figure 3:
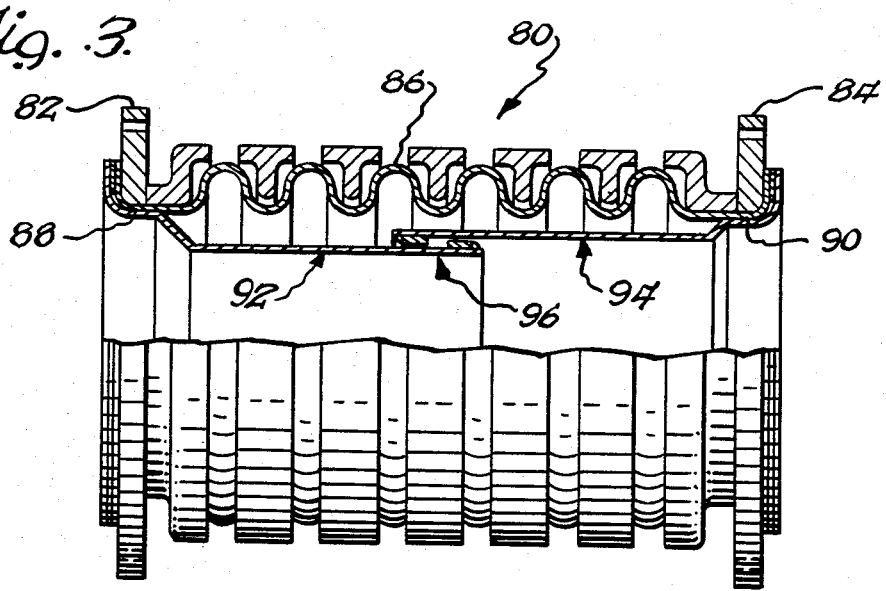
FIG. 3 is an elevational view, partly in section, of a bellows-type expansion joint similar to that of FIG. 1 and showing an alternative way of installing the internal stop means of the present invention.

While the present invention has been described in an illustrative embodiment, it will be understood that further modifications and substitutions can be made without departing from the spirit of the invention. For example, although each stop member of the expansion joint 10 has been described as comprising a ring and a sleeve fixedly attached to one another, other structures may be employed. For example, each stop member having the form of a sleeve and an attached ring, can be formed or machined as an integral unit and be in accordance with the present invention. Also, while annular rings 38,42 have been described, the stop elements could be in the form of separate elements at spaced intervals around sleeves 36,40 and in proper circumferential alignment. In accordance with another aspect of the invention, one stop element could be fixed to one end section of the joint, for example end section 16 shown in FIG. 1. and the other stop element located axially outwardly of the one stop element and operatively associated therewith could be fixed to the end of a single sleeve extending along the entire length of the bellows and fixed to the other end section, for example end section 14 as shown in FIG. 1. Furthermore, although the stop members 32 and 34 of the stop means 30 have been described as being attached to nipples 18 and 20 forming the joint end portions 14 and 16, respectively, the stop members can be slip fit to the outer opposite ends of the bellows and still be within the scope of this invention. There is shown in FIG. 3 a bellows-type expansion joint 80 having flanged end rings 82, 84 adapted for connection with bolts to pipe end portions of corresponding configuration. The joint 80 includes a bellows 86 having end sections 88 and 90 extending through and around respective flange rings 82 and 84. In accordance with this aspect of the invention, stop means 96 including a first stop member 92 and a second stop member 94 have end sections which extend around the end sections 88 and 90 of the bellows in a slip fit manner.

It is therefore apparent that the present invention accomplishes its intended objects. While an embodiment of the present invention has been described in detail, this is for the purpose of illustration, not limitation.

I claim:

1. An expansion joint for connection between spaced apart and aligning ends of two pipes, said expansion joint comprising:

two end portions oriented in spaced relationship and in axial alignment with one another and connectable between two spaced and aligning pipe ends;

a corrugated tubular member defining a series of circumferential corrugations along its length and defining two opposite ends which are each fixedly attached to a corresponding end portion of said joint;

a first sleeve having two opposite ends and being positioned substantially within said tubular member, one end of said first sleeve being supportedly connected to one of said end portions for axial movement therewith;

a first stop member being attached to the inner wall of said first sleeve adjacent the other of its ends;

a second sleeve having two opposite ends and being positioned substantially within said tubular member, one end of said second sleeve being supportedly connected to the other of said cylindrical end portions for axial movement therewith, the other end of said second sleeve being positioned within the first sleeve so that said first and second sleeves collectively serve to reduce turbulence induced by high velocity flow through said expansion joint and to protect the internal surface of said corrugated tubular member from erosion; and a second stop member being attached to the outer wall of said second sleeve adjacent the other of its ends, said first and second stop members located substantially midway between said two cylindrical end portions and cooperating with one another to limit the axial extension of said joint.

2. An expansion joint as defined in claim 1 wherein said first stop member defines a first abutment surface and said second stop member defines a second abutment surface, said abutment surfaces being movable into and out of engagement with one another as said joint extends axially to or contracts axially from a predetermined length.

3. An expansion joint as defined in claim 1 wherein said first stop member includes a first ring fixedly attached to the inner wall of said first sleeve and said second stop member includes a second ring fixedly attached to the outer wall of said second sleeve.

4. An expansion joint as defined in claim 3 wherein said first ring is fixedly attached to said first sleeve by a plurality of welds and said second ring is fixedly attached to said second sleeve by a plurality of welds, said welds being sufficient in amount to prevent the rings from shearing due to the amount of axial thrust expected to be experienced by said joint.

5. An expansion joint as defined in claim 3 wherein said rings have radial thickness sufficient to resist the amount of axial thrust expected to be experienced by said joint.

* * * * *